(12) United States Patent
Noll et al.

(10) Patent No.: US 9,896,078 B2
(45) Date of Patent: Feb. 20, 2018

(54) MASTER BRAKE CYLINDER ASSEMBLY OF A MOTOR VEHICLE BRAKE SYSTEM HAVING A FILTER ELEMENT, AND FLUID RESERVOIR AND INSERT ELEMENT THEREFOR

(71) Applicant: Lucas Automotive GmbH, Koblenz (DE)

(72) Inventors: Daniel Noll, Andernach (DE); Lothar Zeuner, Steineroth (DE)

(73) Assignee: LUCAS AUTOMOTIVE GMBH, Koblenz (DE)

( * ) Notice: Subject to any disclaimer, the term of this patent is extended or adjusted under 35 U.S.C. 154(b) by 186 days.

(21) Appl. No.: 14/907,457

(22) PCT Filed: Jul. 18, 2014

(86) PCT No.: PCT/EP2014/065493
§ 371 (c)(1),
(2) Date: Jan. 25, 2016

(87) PCT Pub. No.: WO2015/011045
PCT Pub. Date: Jan. 29, 2015

(65) Prior Publication Data
US 2016/0176390 A1 Jun. 23, 2016

(30) Foreign Application Priority Data
Jul. 23, 2013 (DE) .......................... 10 2013 012 237

(51) Int. Cl.
*B60T 11/22* (2006.01)
*B60T 17/06* (2006.01)
*B01D 35/00* (2006.01)

(52) U.S. Cl.
CPC ............ *B60T 11/22* (2013.01); *B01D 35/005* (2013.01); *B60T 17/06* (2013.01)

(58) Field of Classification Search
CPC ........... B60T 11/22; B60T 17/06; B60T 11/26
(Continued)

(56) References Cited

U.S. PATENT DOCUMENTS 4,062,774 A 12/1977 Hinojosa
4,152,897 A 5/1979 Falk
(Continued)

FOREIGN PATENT DOCUMENTS

DE 3803565 A1 8/1989
DE 3808522 A1 9/1989
(Continued)

OTHER PUBLICATIONS

German Search Report, Application No. DE 10 2013 012 237.6, dated Feb. 28, 2014.
(Continued)

*Primary Examiner* — Thomas E Lazo
(74) *Attorney, Agent, or Firm* — MacMillan, Sobanski & Todd, LLC

(57) ABSTRACT

A master brake cylinder assembly of a motor vehicle brake system includes a fluid reservoir and a master brake cylinder. The fluid reservoir and the master brake cylinder are fluidically coupled to each other by means of at least one fluid channel. At least one filter element is arranged within the master brake cylinder assembly in such a way that a brake fluid volume exchanged between the master cylinder and the fluid reservoir during operation flows through the filter element. The filter element is designed to collect dirt particles present in the brake fluid.

14 Claims, 3 Drawing Sheets

(58) Field of Classification Search
USPC .......................................................... 60/585
See application file for complete search history.

(56) References Cited

U.S. PATENT DOCUMENTS

| | | | | |
|---|---|---|---|---|
| 4,514,980 | A * | 5/1985 | Ishiwata | B60T 11/26 60/534 |
| 4,805,668 | A * | 2/1989 | Genter | B60T 11/26 137/558 |
| 4,951,470 | A | 8/1990 | Reinartz et al. | |
| 5,493,863 | A * | 2/1996 | Yanagi | B01D 29/23 210/444 |
| 7,073,333 | B2 * | 7/2006 | Tsubouchi | B60T 11/26 60/585 |
| 7,261,123 | B2 | 8/2007 | Kim | |
| 7,261,382 | B2 | 8/2007 | Hayashi | |
| 7,926,268 | B2 * | 4/2011 | Egawa | B60T 11/232 60/585 |
| 8,615,995 | B2 | 12/2013 | Neumann et al. | |
| 9,156,455 | B2 | 10/2015 | Schmitt et al. | |
| 2005/0062343 | A1 | 3/2005 | Hayashi | |
| 2010/0205957 | A1 * | 8/2010 | Tandler | B60T 11/26 60/534 |

FOREIGN PATENT DOCUMENTS

| | | |
|---|---|---|
| DE | 10002118 A1 | 7/2001 |
| DE | 102007035840 A1 | 9/2008 |
| DE | 102007035842 A1 | 12/2008 |
| DE | 102007037225 A1 | 1/2009 |
| EP | 2213537 A1 | 8/2010 |
| FR | 2344428 A1 | 10/1977 |
| FR | 2926766 A1 | 7/2009 |
| GB | 2216968 A | 10/1989 |
| WO | 2011006784 A1 | 1/2011 |

OTHER PUBLICATIONS

PCT International Search Report, Application No. PCT/EP2014/065493, dated Oct. 9, 2014.
PCT International Preliminary Examination Report, Application No. PCT/EP2014/065493, dated Sep. 4, 2014.

* cited by examiner

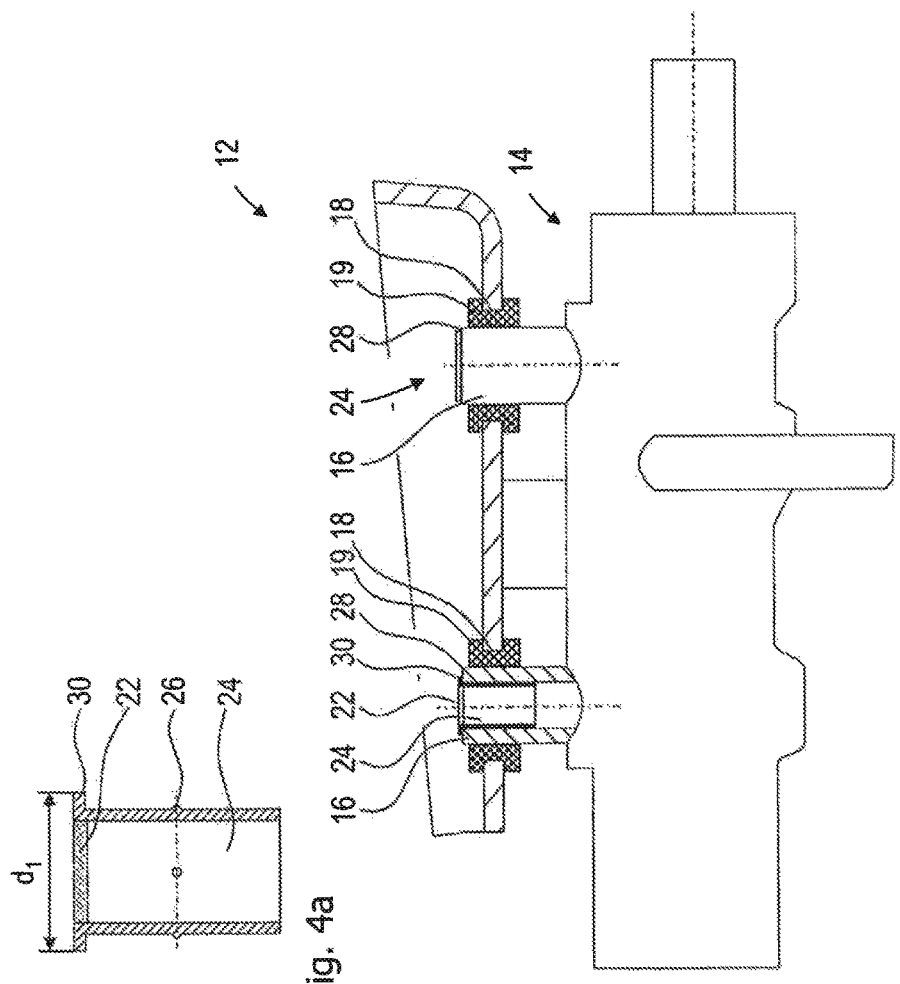
Fig. 4a
Fig. 4
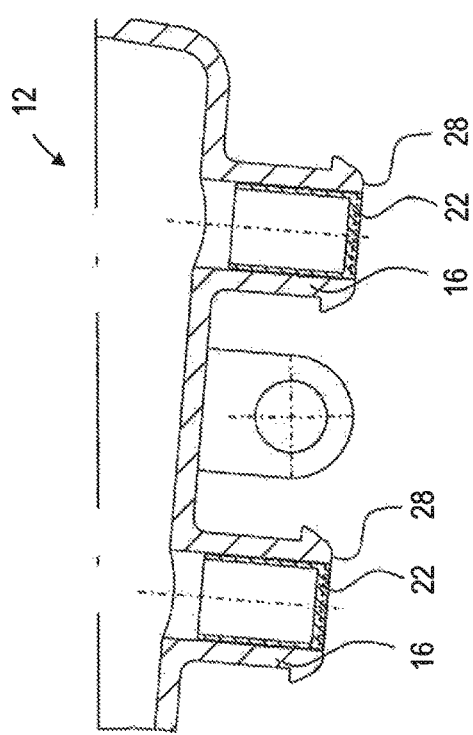
Fig. 3

MASTER BRAKE CYLINDER ASSEMBLY OF A MOTOR VEHICLE BRAKE SYSTEM HAVING A FILTER ELEMENT, AND FLUID RESERVOIR AND INSERT ELEMENT THEREFOR

CROSS-REFERENCE TO RELATED APPLICATIONS

This application is the National Phase of International Application PCT/EP2014/065493 filed Jul. 18, 2014 which designated the U.S. and that International Application was published on Jan. 29, 2015 as International Publication Number WO 2015/011045 A1. PCT/EP2014/065493 claims priority to German Patent Application No. 10 2013 012 237.6, filed Jul. 23, 2013. The disclosures of both applications are incorporated herein by reference.

BACKGROUND OF THE INVENTION

The invention relates to a master brake cylinder assembly of a motor vehicle brake system, comprising a fluid reservoir and a master brake cylinder, wherein the fluid reservoir and the master brake cylinder are fluidically coupled to each other by means of at least one fluid channel.

Such master brake cylinder assemblies are generally known from the background art. In this case the fluid reservoir is used to receive a brake fluid, which may be conveyed through the fluid channel into the master brake cylinder and from there into further regions of a fluid circuit of the motor vehicle brake system. The infeed of brake fluid from the fluid reservoir may occur temporarily in order for example to compensate wear conditions within the motor vehicle brake system. Fluid flows may occur equally as a function of individual operating states, for example in the form of a return flow of brake fluid from the fluid circuit into the fluid reservoir as a result of a reduction of a brake pressure within the motor vehicle brake system. In modern motor vehicle brake systems it is moreover a common practice for further, automatically operated brake pressure-generating devices to be connected to the fluid circuit. These may remove brake fluid from the fluid reservoir via the fluid channel and the master brake cylinder in order to build up a brake pressure.

A problem associated with such master brake cylinder assemblies is that dirt particles that are already present in the fluid reservoir prior to final assembly may mix with the brake fluid contained therein and subsequently be distributed through the entire fluid circuit of the motor vehicle brake system. In this case further components of the motor vehicle brake system that come into contact with the brake fluid may be functionally impaired or damaged. The dirt particles may equally form deposits that locally narrow or block cross-sections of flow within the fluid circuit. This impairs in particular the mode of operation of those motor vehicle brake systems which—as described above—remove brake fluid from the fluid reservoir via automatic brake pressure-generating devices. The brake fluid in these cases has to travel comparatively long distances through fluid channels of at times small dimensions within the fluid circuit, which travel may be considerably hampered by corresponding deposits. And so, as a result of an introduction of dirt particles or impurities the response behaviour of the entire motor vehicle brake system may be adversely affected.

To avoid such problems, when the fluid reservoir is filled for the first time with brake fluid or topped up during servicing, occasionally use is made of sieve arrangements that are arranged temporarily or permanently in filling openings of the fluid reservoir. These sieve arrangements prevent an ingress from the environment of dirt particles that might be dispersed from the fluid reservoir in the fluid circuit.

Such solutions cannot however prevent dirt particles or impurities, which have already been introduced into the fluid reservoir during manufacture of the master brake cylinder assembly, from mixing with a brake fluid contained therein. To combat this risk, up till now complicated processes for cleaning the fluid reservoir prior to a mounting on the master brake cylinder have been carried out. This entails separate production steps and—facilities and increases the necessary manufacturing time and the costs considerably. Also, in the event of subsequent storage or transportation of prefabricated fluid reservoirs prior to a mounting on a master brake cylinder, suitable precautions have to be taken to avoid a re-contamination of the fluid reservoir. In other words, up till now by means of relatively complicated additional measures it has been necessary to ensure that the fluid reservoir prior to mounting on the master brake cylinder is completely free of impurities.

From the background art moreover the document WO 2011/006784 A1 is known, which discloses an arrangement for preventing air bubbles from passing from a fluid reservoir into a master brake cylinder of a manually operated motor cycle brake. For this purpose, a large connecting piece that projects into the interior of the fluid reservoir is provided, which is designed with blocks that have through-openings. These are dimensioned in accordance with an anticipated size of the air bubbles. In this case too, an onward transport of dirt particles that are present in, or have been introduced subsequently into, the fluid reservoir cannot be prevented and the fluid reservoir would have to undergo a complicated cleaning process prior to mounting.

The document DE 10 2007 037 225 A1 further discloses a fluid reservoir having a filling filter that is arranged in the region of a filler neck of the fluid reservoir. As discussed above, with such an arrangement only the introduction of dirt particles during a filling operation may be prevented, whereas impurities already present in the fluid reservoir cannot be collected.

From the U.S. Pat. No. 7,261,123 B2 a reservoir container for a servo control system of a motor vehicle is known, in which a filter element is arranged between an upper and a lower housing region. The filter element is a component part of a solution to prevent the formation of air bubbles in the reservoir container.

The U.S. Pat. No. 7,261,382 B2 discloses a solution to prevent brake fluid from spraying out of the inlet opening of a reservoir container, for example during a venting of the fluid circuit through repeated actuation of the brake pedal. In this case also, a filter element may be arranged inside the reservoir container, through which filter element the brake fluid passes as it flows between various fluid chambers inside the reservoir container. During a flow out of the fluid chambers into the master brake cylinder, however, no filtering takes place, with the result that in particular production-related impurities may be dispersed substantially unimpeded in the fluid circuit.

From the U.S. Pat. No. 4,062,774 A a filter apparatus in the form of a separate assembly group is known, which may be connected by tubes to a fluid reservoir and a master brake cylinder.

It is therefore desirable to provide a master brake cylinder assembly that may be manufactured with a low outlay and at low cost.

This is achieved by various embodiments of a master brake cylinder assembly of the type described in the introduction, in which it is provided that at least one filter element is arranged within the master brake cylinder assembly in such a way that a brake fluid volume exchanged between master brake cylinder and fluid reservoir during operation flows through the filter element, wherein the filter element is designed to collect dirt particles present in the brake fluid.

SUMMARY OF THE INVENTION

Thus, in a departure from the measures previously taken, according to the invention there is no longer any need to clean the fluid reservoir so that it is completely free of any dirt particles prior to mounting on the master brake cylinder. Rather, such dirt particles are collected by the filter element according to the invention only upon and/or after start-up of the motor vehicle brake system, with the result that these dirt particles cannot penetrate and be dispersed in the fluid circuit of the motor vehicle brake system. By providing the filter element the fact that up to specific orders of magnitude dirt particles are present in the fluid reservoir or are introduced into the fluid reservoir after a top-up of brake fluid may therefore be taken into account and also compensated. This reduces the previously required outlay in particular during the manufacture of the master brake cylinder assemblies according to the invention since a completely dirt-free state of the fluid reservoirs that are to be mounted is no longer necessary.

In this case, according to the invention the filter element is arranged selectively in the fluid reservoir, the master brake cylinder or in further elements within the master brake cylinder assembly that define areas of cross section, through which the brake fluid flows. For example sealing elements, which are arranged between fluid reservoir and master brake cylinder to achieve a fluidically sealed connection, may be designed with a corresponding filter element.

In a development of the invention it is provided that the filter element is of a substantially planar design. Here, by a planar design is meant substantially that the cross section of the filter element, through which the brake fluid flows, in its dimensions is dimensioned larger than a thickness of the filter element and/or than the distance travelled by the brake fluid as it flows through the filter element. As a result the flow resistance of the filter element may be reduced and a rapid response behaviour of the motor vehicle brake system is guaranteed.

According to the invention it is further provided that the filter element is arranged in or on a component of fluid reservoir and master brake cylinder. In other words, a selective arranging of the filter element in and/or on the fluid reservoir or the master brake cylinder is provided. In this case it may generally be provided that the filter element is arranged so-to-speak in an interior of the appropriate component or on the outside thereof, in particular on an end face of connecting regions that are used to establish a fluidic connection with the respective other component. An arrangement in or on the fluid reservoir enables any dirt particles immediately in the region of the fluid reservoir to be collected and prevented from being transported into further regions of the master brake cylinder assembly. Furthermore, the cross-sectional areas of the fluid reservoir, through which the brake fluid flows, are typically dimensioned relatively large compared to the remaining regions of a fluid circuit of a motor vehicle brake system. Any dirt particles that are collected by the filter element and form deposits thereon therefore impair the flow of fluid within the fluid circuit only slightly, thereby guaranteeing a consistent response behaviour. For an arrangement in or on the master brake cylinder the connecting regions to the fluid reservoir are particularly to be recommended since these are usually easily accessible from outside.

The invention further provides that the respective component of fluid reservoir and master brake cylinder comprises a connecting piece, by which it is coupled to the respective other component of fluid reservoir and master brake cylinder, wherein the filter element is arranged in or on the connecting piece. The connecting piece is advantageously designed with a smaller cross-section than the remaining regions of fluid reservoir and master brake cylinder. The filter element may accordingly be likewise of less large dimensions and at the same time the entire exchanged fluid volume may nevertheless flow through. This leads to corresponding reductions in weight and cost. Given an arrangement in the fluid reservoir it is particularly advantageous if the filter element is arranged on, and/or is flush with, an outer end portion of the connecting piece. In this case the filter element is arranged in the last cross-sectional area of the fluid reservoir through which an outflowing brake fluid volume flows. All of the regions of the fluid reservoir that have impurities and might transfer these to the brake fluid are therefore arranged upstream of the filter element. This considerably reduces the risk of an ingress of dirt particles from the fluid reservoir.

In this connection, according to the invention it may further be provided that the connecting piece takes the form of a projection that protrudes from the respective component of fluid reservoir and master brake cylinder. This ensures ease of access for arranging the filter element in the connecting piece, thereby facilitating the manufacture of the master brake cylinder assembly. In an advantageous manner, in this case according to the invention it may also be provided that the connecting piece is designed with a circular cross-section. This guarantees that the filter element may be oriented in almost any desired manner relative to the connecting piece, thereby correspondingly reducing the outlay during manufacture. By virtue of a circular cross-section it is moreover also possible to achieve a uniform flow profile of the brake fluid through the filter element.

In a development of the invention it is provided that the filter element is formed integrally with the respective component of fluid reservoir and master brake cylinder. This may be achieved by welding-on, glueing-on or casting of the filter element particularly using a plastics casting process. As a result the production outlay is reduced since no additional subsequent assembly steps are needed to arrange the filter element in or on the appropriate component of fluid reservoir and master brake cylinder. With this embodiment it is moreover guaranteed that the filter element is always connected to the appropriate component so as to be protected against loss. According to the invention it may further be provided that the filter element is arranged in an insert element that is formed separately from the respective component of fluid reservoir and master brake cylinder and is accommodated in said component. Such an insert element may in particular take the form of a cartridge or sleeve having a cylindrical basic body, wherein the filter element is arranged in a cross-sectional plane of the insert element, through which the brake fluid flows. In this case too, an integral forming of insert element and filter element is conceivable. Equally the filter element may be formed separately and fixed in the insert element for example by means of a frictional- or keyed connection. Such insert elements are comparatively small structural parts that are therefore easy to manufacture and easy to handle. They may also be arranged variant-dependently or in the context of retro-fitting in the appropriate component of fluid reservoir and master brake cylinder without these having to be specially adapted to accommodate a filter element. The insert element may generally be manufactured from a metal material or a plastics material and may be combined in any desired manner with a metal filter element or a filter element manufactured from plastics material.

In this connection, it may further be provided that the insert element is fixed by means of a friction locking in the respective component of fluid reservoir and master brake cylinder. By establishing a friction locking it is easily possible to achieve a fixing of the insert element without having to employ additional tools. Additionally or alternatively, according to the invention it may further be provided that the insert element is fixed by means of a detent connection in the respective component of fluid reservoir and master brake cylinder. This may be achieved for example in that the appropriate component or the insert element has at least one detent projection, which is in engagement with a corresponding undercut that is formed in the respective other of the appropriate component and the insert element. The establishing of a corresponding keyed connection by virtue of the engagement between detent projection and undercut provides a particularly reliable mechanism for securing the insert element in or on the appropriate component, with the result that a slipping or falling-out may be prevented.

In this connection, it may further be provided that the insert element is arranged at least in sections within the connecting piece. The connecting piece is a region of the fluid reservoir and master brake cylinder that is particularly easily accessible and which is dimensioned relatively small compared to the remaining cross-sectional areas of the fluid reservoir and master brake cylinder. The outlay for assembly and manufacture of the insert element is therefore reduced. In this case, to achieve a secure arrangement of the insert element in the connecting piece it may advantageously be further provided that the insert element has at least one fastening portion, the cross-sectional dimensions of which at least in sections exceed the internal cross-sectional dimensions of the connecting piece. By said means in a particularly simple manner one of the previously described fastening mechanisms in the form of a friction locking or keyed connection may be achieved. In other words, the insert element in this variant is therefore designed with an interference fit relative to the connecting piece. In this connection, according to the invention it may further be provided that the fastening portion is designed with a projection, which extends around an outer lateral surface of the insert element. By said means in a particularly simple manner a corresponding interference fit arises in a defined manner.

In a development of the invention it is provided that the insert element has a stop portion, which is in abutment with the respective component of fluid reservoir and master brake cylinder and delimits a push-in depth of the insert element in the respective component of fluid reservoir and master brake cylinder. The stop portion may be configured for example in the form of a collar-shaped end portion of a cylindrical, sleeve-shaped insert element. The collar-shaped end portion in this case exceeds the diameter both of the remaining portions of the insert element and of a receiving opening for the insert element in the appropriate component of fluid reservoir and master brake cylinder. The insert element may accordingly be inserted by its end remote from the collar-shaped end portion into the receiving opening and pushed into it until the collar-shaped end portion comes into abutment with the region of the receiving opening. This ensures that the insert element is always positioned in the same way in the respective component of fluid reservoir and master brake cylinder and the potential for errors is reduced particularly in the event of manual mounting of the insert element.

The invention further relates to a separate insert element for a master brake cylinder of the previously described type, wherein all of the above features regarding the insert element may be provided individually or in any desired combination with one another.

The invention further relates to a fluid reservoir for a master brake cylinder assembly of the previously described type. In this case also, all of the above features regarding the fluid reservoir may be provided individually or in combination with one another.

Various aspects of this invention will become apparent to those skilled in the art from the following detailed description of the preferred embodiment, when read in light of the accompanying drawings.

BRIEF DESCRIPTION OF THE DRAWINGS

FIG. 3 is a further representation of the view of FIG. 2;

FIG. 4 is a part-sectional view of a master brake cylinder assembly according to a second embodiment of the invention;

FIG. 4a is a detail view of an insert element shown in FIG. 4 in a component drawing;

DETAILED DESCRIPTION OF THE PREFERRED EMBODIMENT

Figure 1:
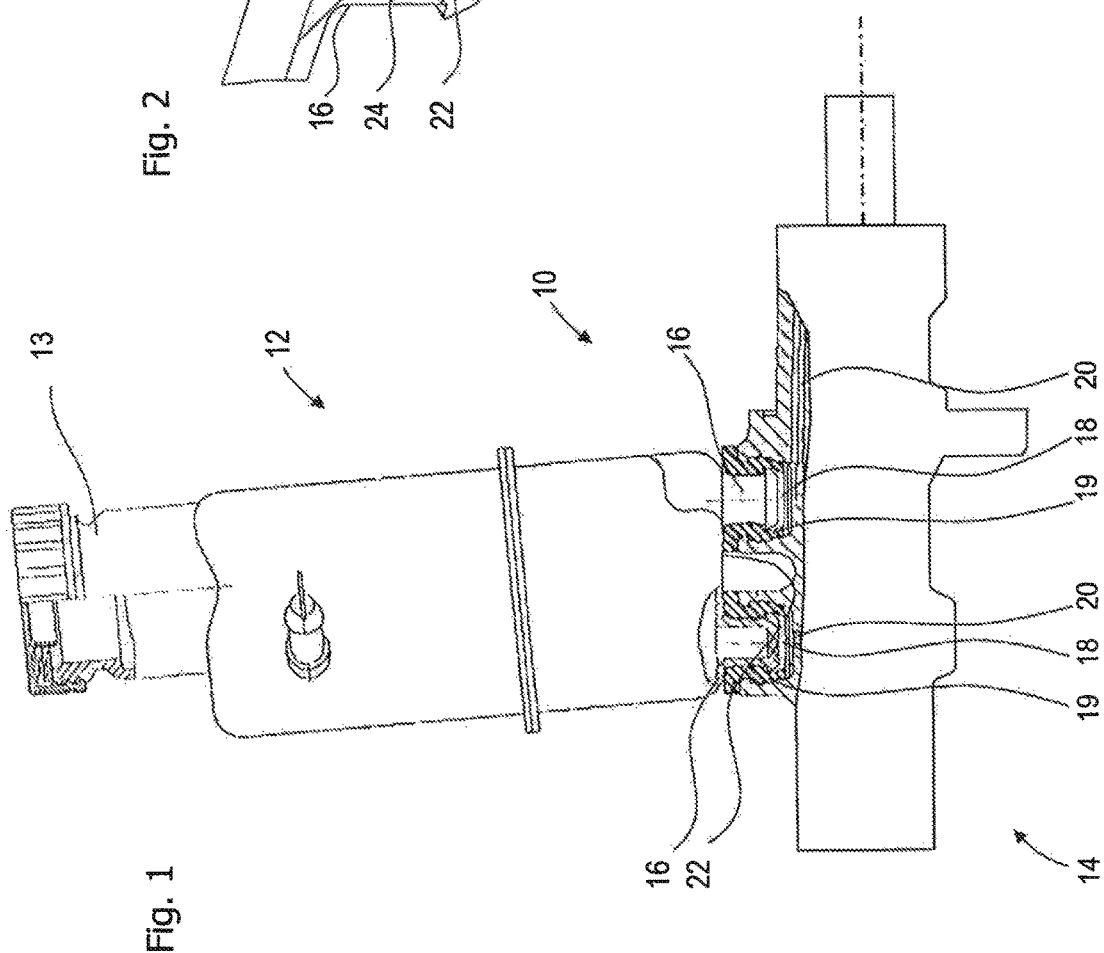
FIG. 1 is a representation of the basic structure of a master brake cylinder assembly according to the invention, wherein the transitional region of fluid reservoir and master brake cylinder is shown in a part-sectional view.

In FIG. 1 a master brake cylinder assembly according to the present invention is shown and denoted generally by 10. The master brake cylinder assembly 10 comprises a fluid reservoir 12, which is coupled to a master brake cylinder 14. The transition region between fluid reservoir 12 and master brake cylinder 14 is shown here in a part-sectional view. It is evident that the fluid reservoir 12 at its, in FIG. 1, upper end has a filling opening 13 and at its, in FIG. 1, lower end has two outlet openings in the form of connecting pieces 16. The connecting pieces 16 each take the form of projections protruding from the fluid reservoir 12 and are accommodated in receiving openings 18 of the master brake cylinder 14. Arranged between the connecting pieces 16 and the receiving openings 18 there is in each case a sealing element 19.

Further evident in FIG. 1 are schematically indicated replenishing bores 20, which extend from the receiving bores 18 in the direction of pressure chambers (not shown in FIG. 1) inside the master brake cylinder. The connecting pieces 16, the receiving bores 18 and the replenishing bores 20 therefore substantially define a fluid channel, which fluidically couples the master brake cylinder and/or pressure chambers thereof and the fluid reservoir. The master brake cylinder 14 is moreover connectable in an as such known manner to further regions and systems of the fluid circuit of a motor vehicle brake system (not shown).

In FIG. 1 in the connecting piece 16 shown in part-sectional view a filter element 22 is indicated, wherein the connecting piece 16 that is not shown in section likewise has such a filter element 22. A brake fluid volume that is exchanged between fluid reservoir and master brake cylinder flows through the filter elements 22, which are designed so as to collect and/or filter out dirt particles present in the brake fluid. As described in the introduction, this relates in particular to dirt particles within the fluid reservoir that might be transported by a brake fluid volume flowing out of the fluid reservoir into downstream regions of the fluid circuit of a motor vehicle brake system. Possible ways according to the invention of arranging such filter elements 22 within the master brake cylinder assembly 10 are now described with reference to concrete embodiments of the invention. In so doing, reference is made to the basic structure described in connection with FIG. 1. Components of an identical type or identical effect are accordingly provided with identical reference characters.

Figure 2:
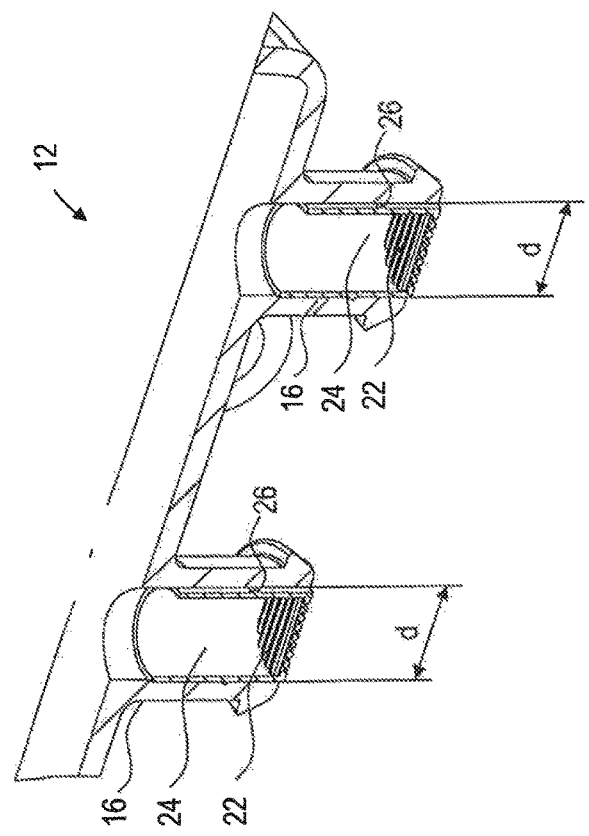
FIG. 2 is a perspective part-sectional view of a fluid reservoir with a filter element arranged therein according to a first embodiment of the invention, wherein all of the elements are shown in a sectional representation.

In FIG. 2 a partial view of a fluid reservoir 12 is shown and represented in a sectional view, wherein the fluid reservoir 12 is designed analogously to the example shown in FIG. 1. It is evident that the fluid reservoir 12 again comprises two connecting pieces 16, which are designed with a circular internal cross-section that has a diameter d. According to the first embodiment of the invention shown in this figure, there is arranged in each of the connecting pieces 16 an insert element 24, in which a relatively close-meshed filter element 22 is accommodated. The insert elements 24 take the form of cylindrical and/or tubular hollow bodies and have a fastening portion 26 in the form of a bead-like projection that extends around the insert elements 24 on the outer lateral surface thereof. The fastening portion 26 defines a diameter of the insert elements 24 that, in the non-mounted state of the insert elements 24, slightly exceeds the inside diameter d of the connecting pieces 16. In other words, the insert elements 24 in the region of the fastening portion 26 are designed with an interference fit relative to the internal cross-section of the connecting pieces 16. In the illustrated example both the insert elements 24 and the fluid reservoir 12 are manufactured from plastics material. In order to overcome the interference fit the insert elements 24 are arranged with a slight elastic deformation in the connecting pieces 16. This produces a clamping force and/or a friction lock between the elements that fixes the insert elements 24 in the respective connecting piece 16.

In the illustrated example the filter element 22 is represented schematically as a planar close-meshed lattice body. In principle any structures that enable a separation and/or collection of dirt particles from a brake fluid volume flowing through the filter element 22 are suitable. The exact mesh- or pore size of the filter element 22 is adapted in this case to an anticipated size and/or quantity of the dirt particles.

FIG. 3 shows a further view of the representation of FIG. 1. It is evident that the filter elements 22 and the outermost end portions of the connecting pieces 16 in the form of the end faces 28 are flush with one another. The filter element is therefore arranged in the outermost cross-sectional area of the fluid reservoir 12, through which an outflowing brake fluid volume flows. All of the regions of the fluid reservoir 12 that have impurities and might transfer these to the brake fluid are therefore, in the case in question, disposed upstream of the filter element 22.

FIG. 4 shows a further embodiment of the invention, in which the filter elements 22 are accommodated in the master brake cylinder 14. In contrast to the previously described embodiment, in this case the master brake cylinder 14 is designed with two connecting pieces 16 and the fluid reservoir 12 has corresponding receiving openings 18. Here too, sealing elements 19 are disposed in the receiving openings 18 in order to fluidically seal the connection of the connecting pieces 16 and the receiving openings 18. As in the previous embodiment, insert elements 24 are disposed in the connecting pieces 16 and accommodate in each case a filter element 22. In the detail view 4a it may be seen that the insert elements 22 again have a fastening portion 26 in the form of an annular projection in order to produce a friction lock relative to the connecting piece 16. The insert elements 22 in the illustrated case however differ from the previously described variant in that they have at one of their ends a collar-shaped stop portion 30. This is designed with a diameter d1 that is greater than the inside diameter of the connecting pieces 16, so that the stop portion 30 is in abutment with the connecting pieces 16 and/or the outer end faces 28 thereof. The insert elements 22 may therefore be inserted at most as far as the stop portion 30 into the connecting pieces 16.

It is self-evident that the insert elements 22 described in connection with the first embodiment may equally be inserted into the master brake cylinder assembly according to the second embodiment and vice versa. In other words, the insert elements according to the examples described above are in each case selectively insertable into any connecting pieces of a fluid reservoir or master brake cylinder.

Figure 5:
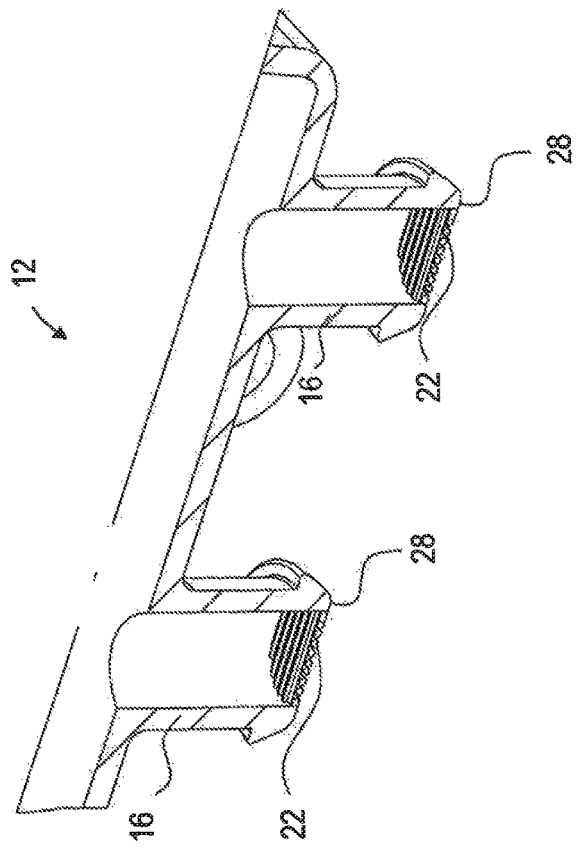
FIG. 5 is a perspective part-sectional view of a fluid reservoir with a filter element arranged therein according to a third embodiment of the invention, wherein all of the elements are shown in a sectional representation.

In FIG. 5 a sectional view analogous to FIG. 2 of a partial region of a fluid reservoir 12 is shown, however for a third embodiment of the invention. In this embodiment the filter elements 22 are formed integrally with the fluid reservoir 12. It is further evident that the filter elements 22 are again disposed within the connecting pieces 16 and are again flush with the outermost end portions thereof. In the illustrated case the filter elements 22 are cast into a plastics body that forms the fluid reservoir 12.

Figure 6:
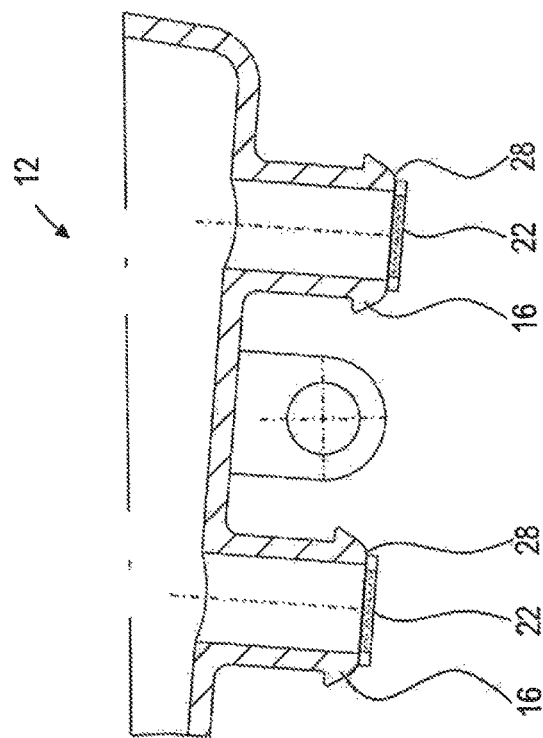
FIG. 6 is a part-sectional view of a fluid reservoir with a filter element arranged therein according to a fourth embodiment of the invention, wherein all of the elements are shown in a sectional representation.

As an alternative thereto, FIG. 6 shows a fourth embodiment, in which a further variant for an integral formation of fluid reservoir 12 and filter element 22 is represented. In this case the filter elements 22 are cohesively attached to the outer end faces 28 of the connecting pieces 16. In this case also, the filter elements 22 are flush with and/or immediately adjoin an outer cross-sectional region of the connecting pieces 16. Thus, all of the impurities emerging from the fluid reservoir may be collected.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. Master brake cylinder assembly of a motor vehicle brake system, comprising a fluid reservoir and a master brake cylinder, wherein the fluid reservoir and the master brake cylinder are fluidically coupled to each other by means of at least one fluid channel, wherein at least one filter element is arranged within the
    master brake cylinder assembly in such a way that a brake fluid volume exchanged between master brake cylinder and fluid reservoir during operation flows through the filter element, wherein the filter element is designed to collect dirt particles present in the brake fluid, wherein the filter element is arranged in or on a component of fluid reservoir and master brake cylinder and the respective component of fluid reservoir and master brake cylinder comprises a connecting piece, by which it is coupled to the respective other component of fluid reservoir and master brake cylinder, wherein the filter element is arranged in or on the connecting piece.

2. Master brake cylinder assembly according to claim 1, wherein the filter element is of a substantially planar design.

3. Master brake cylinder assembly according to claim 1, wherein the connecting piece takes the form of a projection that protrudes from the respective component of fluid reservoir and master brake cylinder.

4. Master brake cylinder assembly according to claim 1, wherein the connecting piece is designed with a circular cross-section.

5. Master brake cylinder assembly according to claim 1, wherein the filter element is formed integrally with the respective component of fluid reservoir and master brake cylinder.

6. Master brake cylinder assembly according to claim 1, wherein the filter element is disposed in an insert element, which is formed separately from the respective component of fluid reservoir and master brake cylinder and accommodated in said component.

7. Master brake cylinder assembly according to claim 6, wherein the insert element is fixed in the respective component of fluid reservoir and master brake cylinder by means of a friction lock.

8. Master brake cylinder assembly according to claim 6, wherein the insert element is fixed in the respective component of fluid reservoir and master brake cylinder by means of a detent connection.

9. Master brake cylinder assembly according to claim 6, wherein the insert element is arranged at least in sections inside the connecting piece.

10. Master brake cylinder assembly according to claim 9, wherein the insert element has at least one fastening portion, the cross-sectional dimensions of which at least in sections exceed the internal cross-sectional dimensions of the connecting piece.

11. Master brake cylinder assembly according to claim 10, wherein the fastening portion is designed with a projection that extends around an outer lateral surface of the insert element.

12. Master brake cylinder assembly according to claim 6, wherein the insert element has a stop portion, which is in abutment with the respective component of fluid reservoir and master brake cylinder and delimits a push-in depth of the insert element in the respective component of fluid reservoir and master brake cylinder.

13. Insert element for a master brake cylinder assembly according to claim 6.

14. Fluid reservoir for a master brake cylinder assembly according to claim 1.

* * * * *